INVENTORS:
MAURICE R. BARTZ
DUANE W. BAXTER
GERALD A. GARRY
DAVID L. JOHNSTON
DAVID A. STYCZINSKI

BY Homer L. Knearl AGENT

Oct. 13, 1970 M. R. BARTZ ET AL 3,534,334

AUTOMATIC CONTROL OF A THRESHOLD IN THE DIGITIZATION OF AN ANALOG SIGNAL

Filed June 20, 1967 3 Sheets-Sheet 2

United States Patent Office 3,534,334
Patented Oct. 13, 1970

3,534,334

AUTOMATIC CONTROL OF A THRESHOLD IN THE DIGITIZATION OF AN ANALOG SIGNAL

Maurice R. Bartz, Duane W. Baxter, Gerald A. Garry, David L. Johnston, and David A. Styczinski, Rochester, Minn., assignors to International Business Machines Corporation, New York, N.Y., a corporation of New York Filed June 20, 1967, Ser. No. 647,415
Int. Cl. G06k 9/02
U.S. Cl. 340—146.3 13 Claims

ABSTRACT OF THE DISCLOSURE

A voltage discriminator is used in a pattern recognition system to convert the analog signal from a scanner into a binary digitized waveform where one level of the waveform represents black and the other level of the waveform represents white. The invention lies in the control of the threshold used in the voltage discriminator. From the thresholds provided in this automatic threshold system, an analog OR circuits selects the blackest threshold and passes it to the voltage discriminator. The analog OR gate selects the blackest threshold from three possible thresholds. One threshold is fixed and is set at a minimum level just above background noise. A second threshold is based upon the blackness of the characters being scanned. This second threshold is generated by a low pass filter which is gated on when the analog signal is above background noise. The third threshold is based either upon the peak blackness of the character being scanned (detected by an analog OR circuit) or the average level of background in the region between elements of the same character (detected by an averaging circuits).

BACKGROUND OF THE INVENTION

The invention relates to the automatic adjustment of a threshold in the analog signal digitizer of a pattern recognition system. More particularly, the invention generates multiple thresholds which would be optimum threshold under different print quality conditions. From these multiple thresholds, the optimum threshold is selected and passed to the analog video signal digitizer.

In the prior art, thresholds for video analog signal digitizers have been largely based upon the peak black or white signal detected by the scanner. The difficulty with this approach is that a very large peak signal may occur on an otherwise light contrast document. In this event, the threshold based upon the peak would be set much too high and thereby fail to digitize some meaningful information. In another prior art approach, the threshold has been set at some level based upon the peak black and peak white analog video signal. This system has the same difficulty in that the amplitude separation of the peaks may be so great as to cause a threshold which would call all of the analog signals either black or white.

A slightly different approach in the prior art is the use of multiple fixed thresholds operating in parallel with the selection of the best information after the analog signal is digitized. This system has the disadvantage of being expensive in that three parallel threshold and digitizing networks are required. Furthermore, it is possible that under given conditions none of the fixed thresholds may be exactly right to obtain the correct digitization of the video analog signal.

The basic problem is how to digitize a video analog signal when there is no control over the type of documents used or the print quality on the documents. Documents from different sources will have different print quality problems. The problems can be largely separated into two categories based upon the source of the printed document. The two categories are typewritten documents and machine printed documents.

In machine printed documents the print quality problem is largely variations in contrast or blackness of the characters printed from document to document. These contrast variations are largely due to life of the ribbons used for inking. An old ribbon, of course, will have a much lighter print quality than a new ribbon. Further, there may be contrast variations in a field of characters or even in a single character. Contrast variations in a field would be caused by the print mechanism not being flat with respect to the paper, while contrast variations in a character would be caused by a single type key not being flat with respect to the paper. Another problem in machine printing is the width of the lines or elements in a printed character. These character line widths may vary from document to document because the ribbons used in printing each document have different lifes. The printed characters on some documents may be very black and thick, while the printed characters on another document may be very light and thin.

In typewritten documents the print quality distortions have largely to do with background noise surrounding the printed character. The noise may be due to ink splatter, smudges or smearing of the ink from handling. In addition, occasionally keys will bounce so that, as the platen moves, a secondary image is printed in the background.

The prior art systems have not been able to cope with these multiple problems of print quality. More often than not the character recognition unit is built with a thresholding system requiring very tight restrictions upon the print quality of the documents which can be handled by the character recognition unit. None of the prior art devices have been able to cope with all of these varied print quality problems in the same video analog digitization system.

PRINCIPLE OF THE INVENTION

It is an object of this invention to automatically adapt the threshold of a digitizer in a pattern recognition system to the quality of the analog video signal so as to achieve the optimum separation of information and non-information in the analog video signal.

It is another object of this invention to adapt the threshold of an analog digitizer to correct for fluctuations in the analog video signal caused by contrast variations in the patterns scanned, to correct for fluctuations in the analog video signal caused by variations in the background surrounding elements of the patterns being scanned, and to compensate for thickly printed characters or thinly printed characters so that the threshold is properly adjusted to separate information from non-information in the analog video signal.

The above objects are accomplished in this invention by independently generating a threshold varying directly with the contrast variations, a threshold varying directly with the peak blackness of the analog signal within a predetermined region of the point of the analog signal currently being digitized and a threshold varying directly with the average level of the analog signal in the same predetermined region. From these thresholds, the optimum threshold under the current scanning conditions can be selected to digitize the analog video signal.

The threshold based upon contrast variations or variations in the darkness of the pattern scanned is the basic threshold. However, when the scanner comes across a character the peak black threshold is used to lift the threshold applied to the digitizer out of noise surrounding the black character. In addition, a smudged or smeared character may have unusually high background noise in its void areas (for example, a smudged letter O with a high gray background in the center of the O). In this situation the average level threshold will lift the threshold applied to the digitizer above this background noise. In addition, variations in the width of elements of patterns scanned can result in too much or too little digitized information for proper recognition. To correct for this variation in line width of the patterns, a line width servomechanism is provided which detects the line width and feeds back an adjustment to shift the contrast variation threshold or the peak black threshold so that as digitized the elements of the pattern scanned will have approximately the same line width.

The great advantage of this invention is that the digitizer is adapted to handle multiple types of documents from either typewritten sources or machine printed sources. The threshold may be adapted to the variations in print quality of these multiple types of printing. In addition, the system also responds fast enough to adapt the threshold to variations in print quality as they occur from character to character and even within the same character. Furthermore, because the system works both on contrast variations and peak detection, the threshold can be adapted for extreme variations of print conditions on the same document or in the same field of characters.

DESCRIPTION

Figure 2:
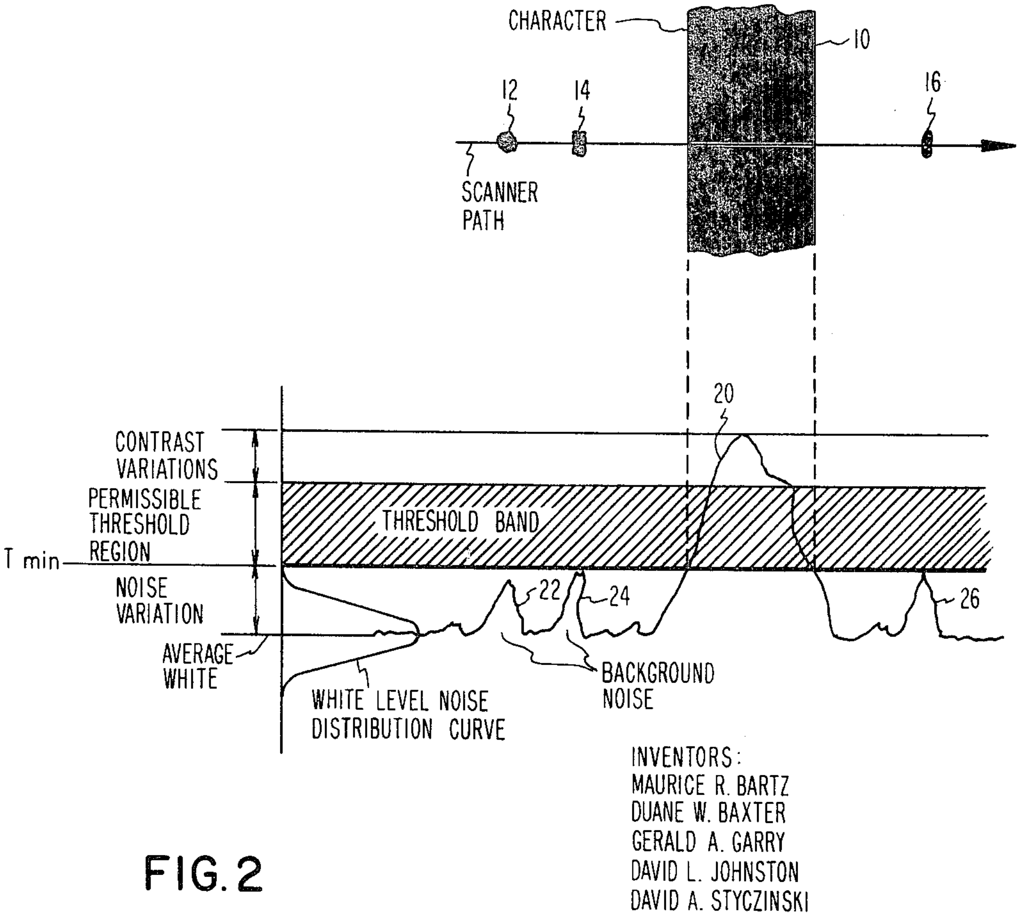
FIG. 2 shows the analog signal from a typical scan through an element of a character and the associated noise threshold and contrast regions used in the analysis of the analog signal.

In FIG. 2, a typical scan path through an element of a character and the associated video signal are shown. The scan path in addition to crossing an element 10 of the character also intersects dirt specks 12, 14 and 16. The large pulse 20 in the analog video signal is due to the scanner intercepting the element 10 of the character. The noise spikes 22, 24 and 26 are associated with the scanner intercepting the dirt specks 12, 14 and 16, respectively.

At the left-hand side of FIG. 2, the analog signal is broken down into three different regions—noise variations, permissible threshold region or threshold band, and contrast variations. Also, the white level noise distribution curve is shown plotted about the average white level. The noise variations are in the region above average white and below the extreme upper edge of the white level noise distribution curve. The noise spikes 22, 24 and 26 fall in the noise variation region and in fact are relatively extreme examples as shown by their height relative to the white level noise distribution curve.

The top region in the analog video signal is the contrast variation region. In this region variations in the height of the analog signal are due to variations in the darkness or blackness of the element of the character through which the scanner passes. The region between the bottom of the contrast variations and the top of the noise variations is a region where it is most desirable to place the threshold for the digitizer. The bottom of this threshold band is defined by a threshold T minimum (T min.) which may be empirically determined. T min. should be located just above the extreme upper edge of the white level noise distribution curve.

In the implementation of the preferred embodiment of the invention, the average white level is held fixed and the system operates relative to that average white level. Holding the average white level fixed is accomplished by an automatic gain control circuit (not shown) placed between the scanner transducer and the delay line 30 in FIG. 1. A low pass filter (0 to 200 Hz.) precedes the gain control circuit. The purpose of the automatic gain control is to eliminate low frequency variations in the analog signal due to different gray level backgrounds from different colored documents. In other words as a result of the automatic gain control, it makes no difference whether the system is scanning white paper, yellow paper, brown paper, etc. For simplicity, it is assumed in this description that the patterns are black printed on a white background. Of course, the system could be designed to operate just as well with white patterns on a black background or for that matter any color combination having a different reflectivity for background and pattern.

Figure 1:
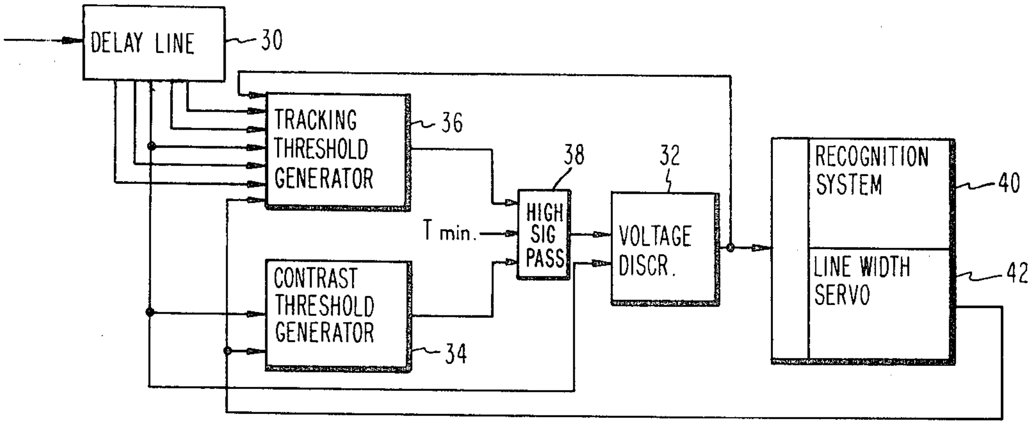
FIG. 1 shows a systems block diagram of the invention.

Now referring to FIG. 1, a systems block diagram of a preferred embodiment of the invention is shown. The delay line 30 receives the analog video signal from the automatic gain control circuit. The delay line 30 has five outputs. The center tap output is passed to the voltage discriminator 32 and to the contrast threshold generator 34. All outputs from the delay line including the center tap are passed to the tracking threshold generator 36. The purpose of the five outputs from the delay line is to give a tracking threshold generator a look ahead and a look behind the digitization point on the analog video signal. The digitization point is the point on the analog signal currently being digitized by the voltage discriminator 32.

Gate 38 is a conventional circuit which produces an output signal equal to the highest of a plurality of input signals. This gate, usually known as an "analog OR" passes the highest threshold it receives to the voltage discriminator 32. The digitized video signal from the voltage discriminator is passed to a recognition system and line width servomechanism and also feedback to the tracking threshold generator 36. The recognition system 40 does not form a part of the invention and is not described. The line width servomechanism 42 is fully described in copending, commonly assigned patent application, Ser. No. 529,090, filed Feb. 12, 1966, entitled "Threshold System," invented by Maurice R. Bartz.

In operation, the analog video signal enters the delay line 30. The center tap from the delay line 30 carries the video signal to the contrast threshold generator 34. The contrast threshold generator acts as a low frequency filter which may be gated on and off. When the analog signal rises above the T min., threshold, the filter passes only the low frequency variations in the analog signal gated to the filter. When the analog signal is below T min., the filter holds the last voltage level it contained when the filter was gated off. In effect, the output of the gated filter tends to rise if large information pulses 20 (FIG. 2) are received and fall if small information pulses 20 are received. Accordingly, the output of the gated filter follows low frequency variations in the darkness or blackness of the patterns being scanned. These variations detected by the gated filter are amplified and shifted into the threshold band (FIG. 2) and passed to the OR gate 38.

The purpose of the tracking threshold generator 36 is to respond to rapid variations in the analog video signal. There are two fairly rapid variations which the tracking threshold generator responds to. The first variation is the peak blackness of the analog signal in a predetermined region bracketing the digitization point. The second is the average level of the analog video signal in the same region bracketing the digitization point. In effect, the peak black output rises in advance of rises in the analog signal and falls after the analog signal falls. The average level signal, on the other hand, tends to follow the analog video signal.

The peak black output is amplified to accentuate the fluctuations and then shifted down so that it will be located in the desirable threshold band. The average level signal, on the other hand, is shifted up so that it will rise above the video signal in short intervals where the video signal is not fluctuating rapidly.

The purpose of the peak black threshold is to provide a threshold which will follow the analog video signal up as large peak black signals are detected. In this way, the digitized output is more definite and less gray area is interpreted as black. The purpose of the average level threshold is to provide a threshold above the video signal when the scanner leaves a definite black area and enters a dirty background area as for example, the smudged or smeared center of an O which has a high gray level background. The peak black threshold is generated by the tracking threshold generator at all times except for a short interval after a black to white transition detected by the voltage discriminator 32. During this short interval after the black to white transition, the tracking threshold generator uses the average level threshold if it rises above the peak black threshold.

Either peak black or the higher of peak black and average level is passed from the tracking threshold generator 36 to the OR gate 38, while simultaneously the low frequency variations are passed from the contrast threshold generator 34 to the OR gate 38. The analog OR gate 38 then continuously selects the maximum or highest threshold and passes this threshold to the voltage discriminator 32. The minimum threshold T min. is also an input to the analog OR gate 38 so as to insure that the threshold passed to the voltage discriminator 32 never goes below the threshold band into the noise variation region.

The digitized video signal is passed to the recognition system 40 and the line width servomechanism 42. The line width servomechanism calculates the thickness of the pattern scanned by counting the number of concentrated black bits and the number of black bits in the entire character. From these counts the line width servo mechanism generates a voltage level indicative of the thickness of the character or pattern scanned. This level is passed back to the threshold generators 34 and 36 and used to shift the thresholds produced by the generators 34 and 36 up or down according to whether the digitized patterns are appearing too thin or too thick.

In summary, the preferred embodiment as shown in FIG. 1 has the ability to adjust the threshold applied to the voltage discriminator 32 to correct for overall variations in blackness of multiple patterns scanned, short term variations in blackness of a given pattern, rises in background noise level of a pattern and variations in the line width of elements of patterns which would tend to produce digitized representations of patterns which are too thick or too thin. By adapting the threshold, the pattern recognition system can scan multiple print quality conditions on machine printed documents or typewritten documents and still produce high quality digitized data which may be processed by the recognition logic.

Figure 3:
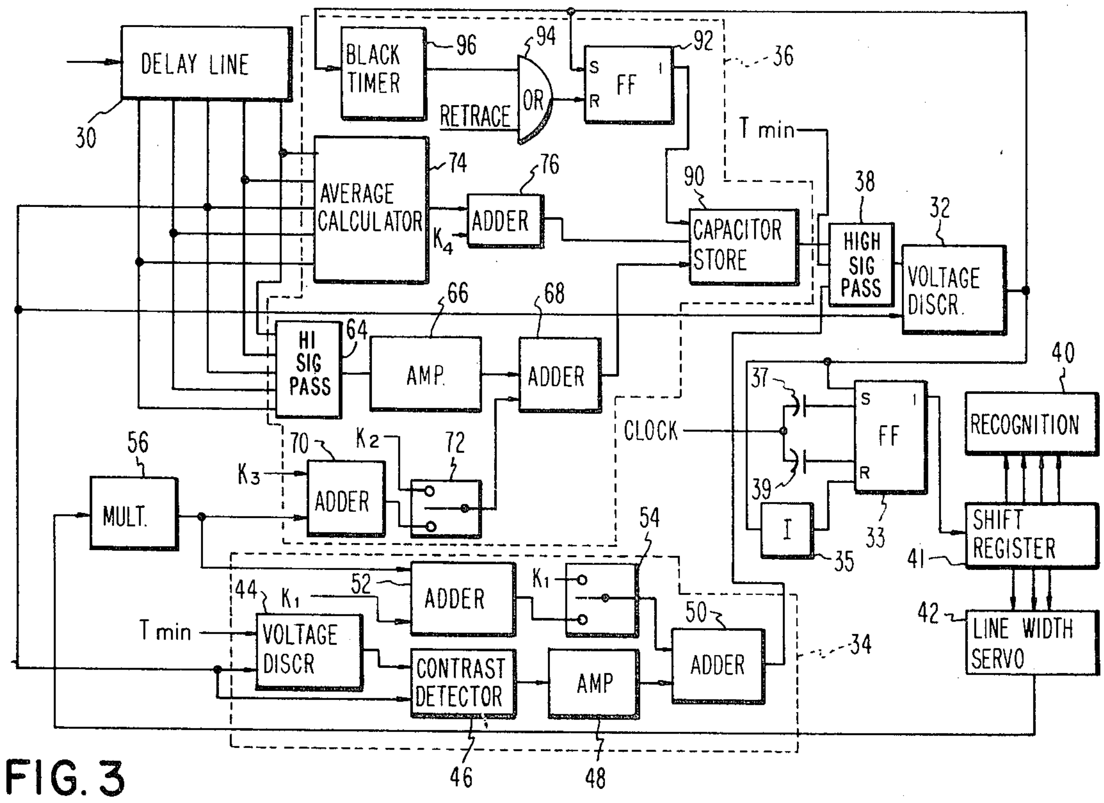
FIG. 3 shows the detailed block diagram of the preferred embodiment of the invention.

Now referring to FIG. 3, the preferred embodiment of the invention is shown in detailed block diagram form. The contrast threshold generator 34 in FIG. 1 comprises in FIG. 3 the voltage discriminator 44, the contrast detector 46, amplifier 48, adders 50 and 52 and switch 54. The voltage discriminator 44 monitors the analog video signal and detects when the video signal rises above T min. While the video signal is above T min., the voltage discriminator 44 gates the contrast detector 46 on. The contrast detector 46 acts as the gated filter to produce the contrast output signal which follows variations in blackness of the patterns being scanned.

The contrast output is amplified by amplifier 48 to accentuate variations in contrast detected by contrast detector 46. In order to shift the amplified contrast output down to the threshold band, adder 50 adds a negative constant provided through switch 54. Switch 54 is manually positioned in one of two positions depending upon whether the system will be scanning machine printed documents or typewritten documents. For typewritten documents a fixed constant $K_1$ is connected via switch 54 to the adder 50. This constant $K_1$ shifts the amplified contrast output down to the threshold band (FIG. 2). On the other hand, if machine printing is being scanned there may be large contrast variations due to variations in line width. In this case the factor to be added to the contrast output in adder 50 is $K_1$ plus variations in line width detected from the line width servomechanism 42. The multiplier 56 reduces the level of the line width correction signal produced by the line width servomechanism to bring the correction factor down to a magnitude appropriate for the threshold band. The reduced line width correction signal is then added to the constant $K_1$ in adder 52 and applied to adder 50 via switch 54.

In effect the contrast detector detects the average darkness or blackness of elements of the patterns being scanned. This average blackness or darkness called the contrast output is amplified to accentuate variations in the contrast detected. Adder 50 then adds in a factor to bring the amplified contrast output down to the threshold band. The factor to be added depends upon whether the system is scanning machine printing or typewriter printing. If typewriter printing is being scanned, a fixed constant $K_1$ determined empirically is applied to adder 50 via switch 54. If, on the other hand, machine printing is being scanned, switch 54 applies a variable factor to adder 50. This variable factor is the same constant $K_1$ plus a signal from the line width servomechanism which may change from pattern to pattern as the line width servomechanism applies adjustments. In summary, the threshold due to contrast will normally be centered in the threshold band with variations therefrom due to variations in blackness of the pattern scanned detected by the contrast detector 46. For machine printing there will also be variations due to line width of the patterns scanned as detected by the line width servomechanism 42.

Figure 5:
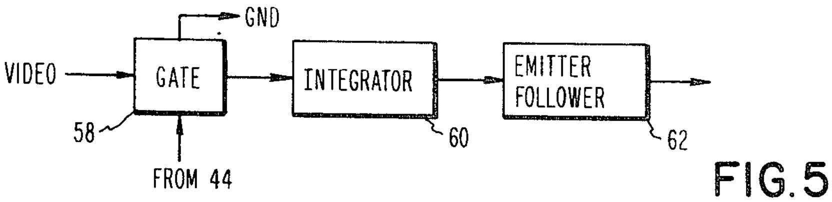
FIG. 5 shows a detailed block diagram of the contrast detector in FIG. 3.

The contrast detector is shown in more detail in FIG. 5 and consists of a gate 58, integrator 60 and emitter follower 62. The gate 58 is controlled by the output from the voltage discriminator 44 to either pass the video signal to the integrator 60 or to shunt the video signal to ground. When the voltage discriminator 44 indicates the video signal is above the T min. threshold, the video signal is passed to integrator 60. When the voltage discriminator indicates the video signal is below the threshold T min., the video signal is shunted to ground. Integrator 60 follows the low frequency variations in the gated video signal it receives. These variations correspond to variations in blackness of the patterns being scanned. To achieve a general accumulation or rise in the output of the integrator 60 would require a succession of pattern elements scanned which are blacker than the previous history of scans. Likewise, a fall in the level in the integrator would require the scanning of successive lighter elements of patterns. The integrator 60 has its output connected to emitter follower 62. This isolates the integrator. When the gate 58 shunts the video to ground, the integrator can neither discharge through the gate or through the emitter follower and therefore holds the last voltage level it contained when the gate 58 switched the video to ground.

Referring again to FIG. 3, the tracking threshold generator 36 of FIG. 1 can be divided into three sections in FIG. 3, the first section being the peak black threshold generator, the second section being the average level threshold generator and the third section being the switching means to select the peak black or the average level threshold.

The peak black threshold generator consists of the analog OR gate 64, amplifier 66, adders 68 and 70 and switch 72. The analog OR gate 64 receives the five analog signals from the delay line 30 and at any given time selects the largest or blackest signal and passes it to amplifier 66. Amplifier 66 amplifies the signal to accentuate variations in the peak black output and passes the amplified peak black output to the adder 68. Adder 68 then adds in a factor to shift the peak black output down to the threshold band so that it may be used as a peak black threshold. The factor added to the peak black output in adder 68 depends upon the position of switch 72. For machine printing the switch 72 connects to a constant factor $K_2$. For typewriter printing the switch 72 adds in a variable factor obtained from adder 70. This variable factor is the sum of $K_3$ plus the output from multiplier 56. The output from multiplier 56 during typewriter printing is normally a constant. $K_3$ and $K_2$ have a difference between them which is equal to the normal constant output from multiplier 56 during typewriter printing. The result is that normally the switch 72 will pass the constant factor $K_2$ to adder 68 even when the switch connects to adder 70. However, if the line width servomechanism detects a thin character or pattern, the output from multiplier 56 decreases which cause the output from adder 70 to decrease which in turn increases the negative factor added to the peak black output in adder 68 and thus causes the peak black threshold to shift down. With the peak black threshold shifted down, there is a better chance for the system to digitize the thinly printed typewritten character.

In summary, the peak black threshold is generated by analog OR 64 monitoring a predetermined region centered about the digitization point on the video signal. This peak black output is exaggerated by an amplifier 66 and then shifted down into the threshold band by an adder 68 adding a negative factor. The magnitude of the factor added is either constant for machine printing or occasionally variable for typewritten printing when the line width servomechanism detects a thinly printed typewritten character.

The average level threshold generator consists of the average calculator 74 and the adder 76. The average calculator 74 receives five analog signals from the delay line 30 and calculates the average level of the analog signals at any given time.

Figure 6:
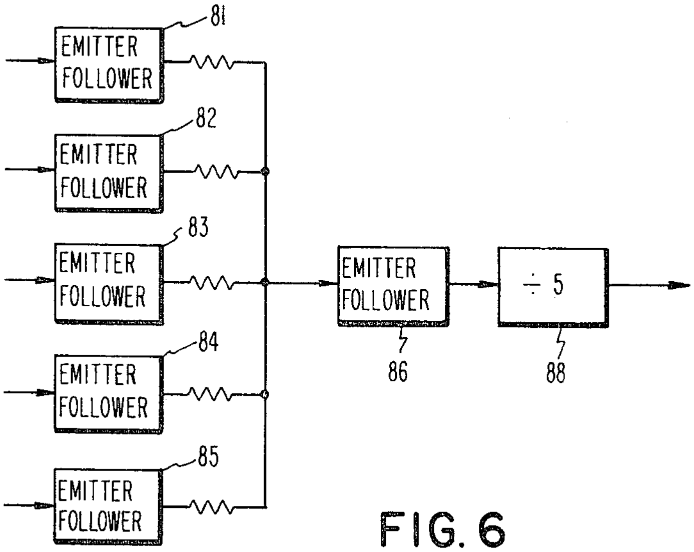
FIG. 6 shows a detail block diagram of the average calculator in FIG. 3.

The structure of the average calculators 74 is shown in FIG. 6. The average calculator is a current summing circuit formed with emitter followers 81 to 86. The purpose of the emitter followers is to isolate the summing circuit from the input and output circuits connected to it. The output of the summing circuit from emitter follower 86 is passed to a voltage divider 88 which divides the summed signal by five so as to arrive at the average for the five analog signals from delay line 30. The output from the voltage divider 88 is passed to adder 76. Adder 76 adds a positive constant factor to the average to raise the average level above the analog video signal when the analog video signal is varying only slowly during the predetermined interval defined by the five sampling points averaged. The output from the adder 76 constitutes the average level threshold.

The last section of the tracking threshold generator 36 is the switching means for selecting either the peak black threshold or the average level threshold. The switching means consists of the capacitor store 90, flip-flop 92, logic OR gate 94 and black timer 96. The capacitor store 90 will store and follow either the peak black threshold from adder 68 or the average level threshold from adder 76. The choice made by the capacitor store 90 is controlled by the condition of flip-flop 92. When flip-flop 92 is reset, the capacitor store circuit 90 follows the peak black threshold. When flip-flop 92 is in a set condition, the capacitor store 90 follows the higher threshold of the peak black threshold and average level threshold.

The flip-flop 92 has an AC set condition so that each time the voltage discriminator 32 switches from a black to white transition, the flip-flop 92 is set. The flip-flop 92 is reset by a signal from logical OR 94. The logical OR 94 will have an output if it receives a pulse from the black timer 96 or if it receives a retrace pulse from the scanner. The retrace pulse from the scanner indicates the scanner is recycling to make another scan through a pattern.

The output from the black timer indicates that for a given time interval the voltage discriminator has indicated black. In other words, the black timer 96 is set so that if the voltage discriminator 32 indicates the detection of black for a predetermined interval, the black timer has an output indicating the scanner is passing through an element of a pattern. The black timer consists merely of a RC integrating circuit and a voltage discriminator. The time constant of the RC circuit is such that a certain amount of black will be required to build up the charge in the capacitor to a level sufficient to trigger the voltage discriminator in the black timer. The output pulse from the voltage discriminator in the black timer is passed by the logical OR 94 to reset flip-flop 92.

Figure 7:
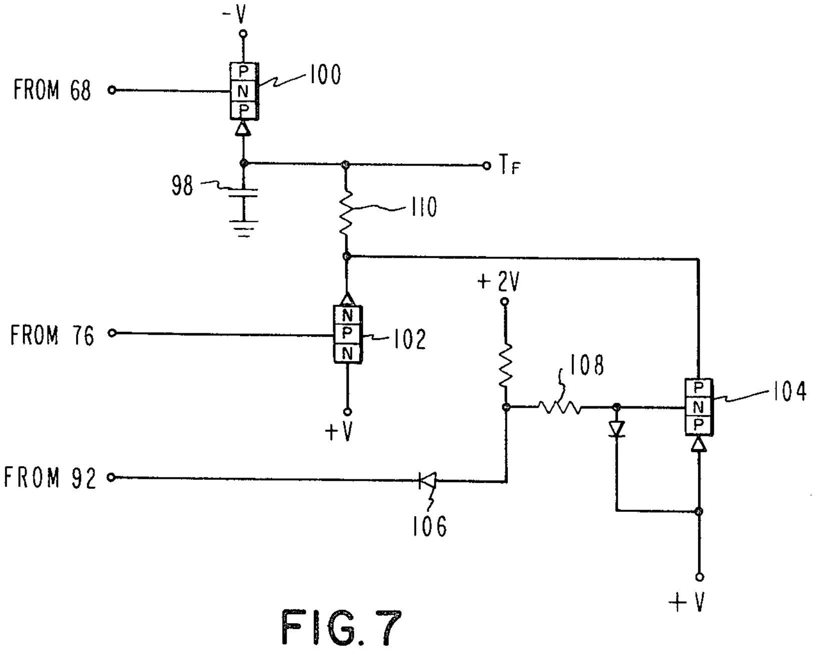
FIG. 7 shows the circuit schematic for the capacitor store circuit in FIG. 3.

Referring now to FIG. 7, a detailed circuit diagram of the capacitor store 90 is shown. The capacitive storage is accomplished in capacitor 98. The peak black threshold on adder 68 is applied to the base of transistor 100. The average level signal from adder 76 is applied to the base of transistor 102. The condition of the flip-flop 92 is applied to the base of transistor 104 through the diode 106 and resistor 108. The capacitor store circuit is designed for a video signal where information peaks are more negative than background and the highest threshold is therefore the most negative threshold.

Initially, flip-flop 92 (FIG. 3) is reset, and the signal from flip-flop 92 is at a low voltage level which causes the transistor 104 to be conductive. With transistor 104 conductive the voltage stored on capacitor 98 will follow the voltage applied to the base of transistor 100 by adder 68. During negative swings of the peak black threshold applied from adder 68, the capacitor is discharged. During positive swings of the peak black threshold, the capacitor 98 is charged by current from transistor 104 through resistor 110. When the flip-flop 92 (FIG. 3) is set, the voltage level from 92 rises and turns off the transistor 104. With transistor 104 turned off, the capacitor 98 will follow the peak black threshold if it is more negative than the voltage stored on capacitor 98. In addition, if while transistor 104 is turned off the average level threshold from adder 76 is more positive than the voltage stored on capacitor 98, the transistor 102 will be turned on and charge capacitor 98 to the more negative voltage level from either the peak black threshold or the average level threshold. In summary, when transistor 104 is turned on, the voltage on capacitor 98 follows the peak black threshold from adder 68. When the transistor 104 is turned off, voltage on capacitor 98 follows negative swings in the peak black threshold below the voltage level on the capacitor and positive swings from the average level threshold above the voltage level on the capacitor up to the more negative voltage level from either the peak black threshold or the average level threshold.

In summary, the capacitor store 90 selects either the peak black threshold or the average level threshold and passes it to analog OR 38. The selection is based upon whether the voltage discriminator has detected a black-to-white transition and also the level of the two thresholds. Normally the capacitor store 90 follows the peak black threshold; however, after a black-to-white transition the capacitor store follows the higher threshold—peak black or average level. Upon detection of black or the start of a new scan, the capacitor store returns to normal operation following peak black.

The analog OR 38 selects the highest threshold from either the T min., the contrast threshold or the selected threshold from the capacitor store 90. The highest threshold is used in the voltage discriminator 32 to voltage digitize the video analog signal.

To digitize in time the output from voltage discriminator 32, flip-flop 33 is driven by a clock. The binary output from discriminator 32 provides DC bias to the set and reset terminals of flip-flop 33. Inverter 35 insures that for a given binary level only one of the set or reset inputs will be biased to change the state of the flip-flop 33. The change of state is actuated by an AC pulse from either capacitor 37 or 39 generated by the clock. The digitized black and white bits are temporarily stored in the shift register 41 for analysis by the recognition logic 40 and the line width servomechanism 42.

OPERATION

Figure 4:
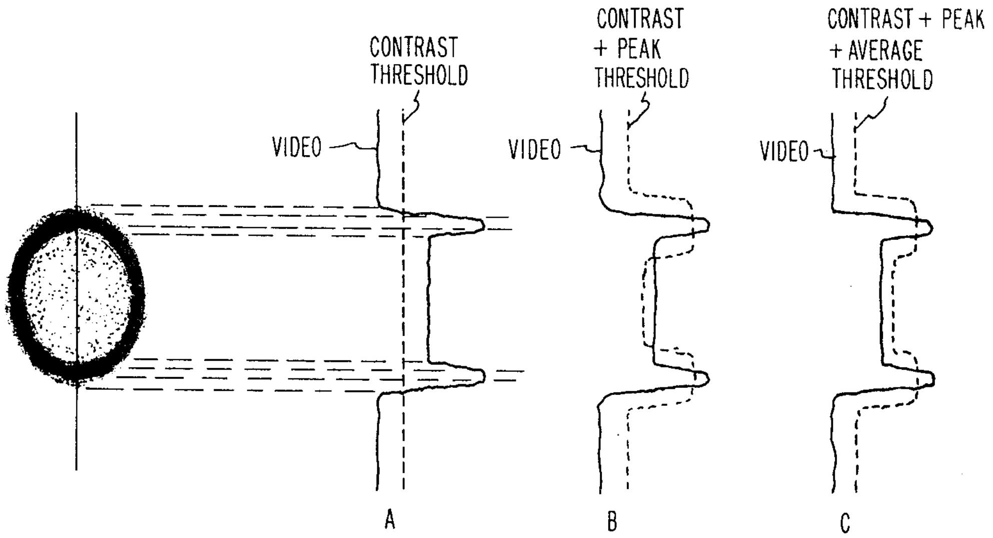
FIG. 4 shows a smudged O and its associated analog signal with various threshold signals.

One example of operation will be described with reference to FIGS. 3 and 4. In FIG. 4 a smudged O with a scan path through the O is shown. The solid line waveforms in examples A, B and C shown in FIG. 4 represent the video signal from the scanner. The dashed line waveforms in examples A, B and C represent the various possible thresholds. In example A, only the contrast threshold is used and the entire O would be digitized as black. In the example B, the contrast threshold and the peak black threshold are used which result in three black portions being identified—two for the true elements of the O and one for the dirty background in the center of the O. Finally, in example C the video signal is properly digitized by use of the contrast threshold with the peak black threshold and the average level threshold. As shown in example C only the top element of the O and the bottom element of the O appear as digitized black for the scan through the center of the character.

The apparatus in FIG. 3 operates to adapt the threshhold as shown in Example C of FIG. 4. As the scanner moves down from the top towards the top of the O, the highest threshold is the contrast threshold. This threshold is established by the contrast detector 46 in accordance with the blackness or darkness of the patterns previously scanned or elements of the same pattern previousy scanned. As the scanner starts to move into the top of the O, the analog video signal rises. The peak black threshold rises before the video signal rises because of the look ahead obtained by means of delay line 30. Prior to the contrast threshold crossing the video signal the peak black threshold will exceed the contrast threshold and pull the threshold applied to the voltage discriminator 32 up (more negative). The threshold of the voltage discriminator 32 then follows the peak black threshold up and this peak black threshold flattens just below the peak of the video signal. The peak black threshold stays below the peak of the video signal because of the factor added by adder 68.

When the video signal punches through the threshold, the voltage discriminator 32 indicates black. This black indication continues until the video falls back through the peak black threshold. The black to white transition as the video signal declines (since the peaks are negative the video signal is actually going more positive) sets the flip-flop 92. Flip-flop 92 then conditions the capacitor store 90 to follow concurrent positive swings from the average level threshold and the peak black threshold and negative swings from the peak black threshold. The average level is moving positive as the black to white transition occurs. However, since the peak black threshold is more negative than the average level threshold the peak black threshold will hold the capacitor 98 (FIG. 7) at the peak black threshold level. Finally, as the peak black threshold also begins to move more positive the average level and peak black threshold acting through transistors 100 and 102 (FIG. 7) will cause the value on capacitor 98 to move positive. The positive swing on capacitor 98 will only go as far as the level applied by the average level threshold (the more negative level from the peak black and average level thresholds). Thus the value stored on capacitor 98 rises to the average level threshold and holds that value as the scanner moves through the center of the O. This average level threshold because of the constant $K_4$ added thereto by adder 76 is held above (more negative than) the video signal and accordingly the center of the O is properly digitized as white.

As the scanner moves through the bottom of the O, the peak black threshold again becomes more negative and drags the value on capacitor 98 (FIG. 7) down. The peak black threshold flattens out as the video signal peaks out and the video signal then punches through the threshold to indicate the digitized black at the bottom of the O. After three microseconds of black, the black timer 96 resets the flip-flop 92. The flip-flop 92 is, however, almost immediately set again by the black to white transition as the video signal passes back through the peak black threshold. Here again the capacitor store circuit follows the positive going peak black threshold and average level threshold. In this case the store circuit follows all the way past the contrast threshold. Analog OR 38 then selects the contrast threshold as the highest threshold and passes it to the voltage discriminator 32. In this way by using all three thresholds, the O with very poor print quality (smudged or filled-in) can be properly digitized into black and white.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Threshold control apparatus in a pattern-recognition system for controlling the threshold of a digitizer converting an analog video signal into a two-level signal, one level for black and the other level for white, said control apparatus comprising:

- accumulating means for summing positive and negative swings in the average level of the video signal;
- first gating means for shunting the video signal away from said accumulating means when the video signal is in white noise;
- second gating means for gating the video signal into said accumulating means when the video signal is above white noise so that the output of said accumulating means follows the average darkness of patterns being scanned; and
- means for generating a threshold signal for the digitizer from the output of said accumulating means so that the digitizer threshold will follow changes in the darkness of the patterns being scanned.

2. In an apparatus for converting an analog input waveform into a digitized output waveform in accordance with the relative magnitudes of said analog waveform and a threshold, a generator for producing said threshold, said generator comprising:

- sensing means for defining a region of said analog waveform relative to a sampling point;
- first generating means coupled to said sensing means for producing a first signal related to a peak magnitude of said analog waveform within said region;
- second generating means coupled to said sensing means for producing a second signal related to an average magnitude of said analog waveform within said region;
- switching means coupled to said first and second generating means capable of producing an upper signal related to the higher of said first and second signals, said switching means also being responsive to said digitized output waveform for selecting one of said first and said upper signals; and
- gating means coupled to said switching means for producing said threshold from said one selected signal.

3. An apparatus according to claim 2, wherein said second generating means comprises:

- means coupled to said sensing means for averaging the magnitudes of said analog waveform within said region; and means for adding a first predetermined factor to said averaged magnitudes to produce said second signal.

4. An apparatus according to claim 3, wherein said first generating means comprises:

means coupled to said sensing means for detecting a peak magnitude of said analog waveform within said region;

means for amplifying said detected peaks; and means for adding a second predetermined factor to said amplified peaks to produce said first signal.

5. An apparatus according to claim 4, further comprising:

means for storing said digitized waveform so as to represent a pattern having lines therein;

means for producing a signal indicative of the width of said lines; and means for producing said second predetermined factor from said line-width signal.

6. An apparatus according to claim 2, wherein said switching means comprises:

means for producing a control signal upon a transition of said digitized waveform from a first level to a second level;

means for terminating said control after a predetermined duration of said second digitized-waveform level; and means responsive to the presence of said control signal for selecting said upper signal over said first signal.

7. An apparatus according to claim 6, wherein:

said sensing means comprises delay means having an input for accepting said analog waveform and having a plurality of output taps spaced therealong;

said first generating means comprises means coupled to said output taps for detecting a peak magnitude of said analog waveform within said region, means for amplifying said detected peaks, and means for adding a second predetermined factor to said amplified peaks to produce said first signal; and said second generating means comprises means coupled to said output taps for averaging the magnitudes of said analog waveform within said region, and means for adding a first predetermined factor to said averaged magnitudes to produce said second signal.

8. An apparatus according to claim 7, further comprising:

integrating means for summing positive and negative swings in the average level of said analog waveform;

filter disabling means coupled to a source of a constant-magnitude fourth signal for disabling said integrating means when said fourth signal exceeds the magnitude of analog waveform;

means for amplifying said summed swings from said integrating means;

means for adding a third predetermined factor to said amplified, summed swings to produce said third signal; and wherein said gating means is further coupled to said source and to said last-named adding means so as to produce said threshold from the highest of said selected signal, said third signal and said fourth signal.

9. In an apparatus for converting an analog input waveform into a digitized output waveform in accordance with the relative magnitudes of said analog waveform and a threshold, a generator for producing said threshold, said generator comprising:

sensing means for defining a region of said analog waveform relative to a sampling point;

first generating means coupled to said sensing means for producing a first signal related to a peak magnitude of said analog waveform within said region;

second generating means coupled to said sensing means for producing a second signal related to an average magnitude of said analog waveform within said region;

switching means coupled to said first and second generating means capable of producing one of a pair of signals related to said first and second signals, said switching means also being responsive to said digitized output waveform for selecting said one signal;

filter means capable of extracting the low-frequency components of said analog waveform;

third generating means coupled to said filter means for producing a third signal related to the magnitudes of said low-frequency components; and gating means coupled to said switching means and to said third generating means for producing said threshold from the higher of said one selected signal and said third signal.

10. An apparatus according to claim 9, wherein said third generating means comprises:

means coupled to said filter means for amplifying said low-frequency components; and means for adding a third predetermined factor to said amplified components to produce said third signal.

11. An apparatus according to claim 10, further comprising:

means for storing said digitized waveform so as to represent a pattern having lines therein;

means for producing a signal indicative of the width of said lines; and means for producing said third predetermined factor from said line-width signal.

12. An apparatus according to claim 9, wherein said third filter means comprises:

integrating means for summing positive and negative swings in the average level of said analog waveform; and filter gating means responsive to a fixed-magnitude fourth signal for passing said analog waveform to said integrating means when said analog waveform exceeds said fourth signal, and for blocking said analog waveform when said analog waveform does not exceed said fourth signal.

13. An apparatus according to claim 12, wherein said gating means is further coupled to said source so as to substitute said fourth signal in place of said third signal and said selected signal for producing said threshold, when said fourth signal exceeds both said third signal and said selected signal.

References Cited

UNITED STATES PATENTS

| | | | |
|---|---|---|---|
| 3,267,293 | 8/1966 | Hinds | 340—146.3 |
| 3,415,950 | 12/1968 | Bartz et al. | 340—146.3 |

MAYNARD R. WILBUR, Primary Examiner

W. W. COCHRAN II, Assistant Examiner